United States Patent [19]
Tauchmann

[11] 4,000,647
[45] Jan. 4, 1977

[54] HEATING DEVICE FOR FLOW SONDES
[75] Inventor: Reinhard Tauchmann, Steinebach, Germany
[73] Assignee: Dornier GmbH., Germany
[22] Filed: June 29, 1972
[21] Appl. No.: 267,500
[30] Foreign Application Priority Data
July 31, 1971 Germany .......................... 2138495
[52] U.S. Cl. .................................. 73/181; 73/212; 73/359 R; 73/384; 219/201
[51] Int. Cl.$^2$ ..................... G01F 21/00; G01F 1/46
[58] Field of Search ................... 73/182, 212, 181; 244/134 D; 219/201

[56] References Cited
UNITED STATES PATENTS

| | | | |
|---|---|---|---|
| 2,861,163 | 11/1958 | Asakawa | 21/222 UX |
| 3,243,753 | 3/1966 | Kohler | 219/222 |
| 3,488,470 | 1/1970 | Weaver | 73/212 X |
| 3,662,149 | 5/1972 | Lipinski | 219/201 |
| 3,750,470 | 8/1973 | Partzsch | 73/212 |

FOREIGN PATENTS OR APPLICATIONS

| | | | |
|---|---|---|---|
| 464,961 | 5/1950 | Canada | 73/212 |

*Primary Examiner*—Richard C. Queisser
*Assistant Examiner*—John P. Beauchamp
*Attorney, Agent, or Firm*—James E. Bryan

[57] ABSTRACT

This invention relates to an improvement in a flow sonde, particularly for measuring aerodynamic values in aircraft such as the total pressure, the static pressure and the total temperature. The improvement comprises thermally controlled resistor means in the sonde body, said means having a low increase of resistance within a specific temperature range and a high increase of resistance in an adjacent range, whereby there is obtained a high heating power at a low ambient temperature and a limitation of the power absorption when a predetermined temperature is reached.

1 Claim, 1 Drawing Figure

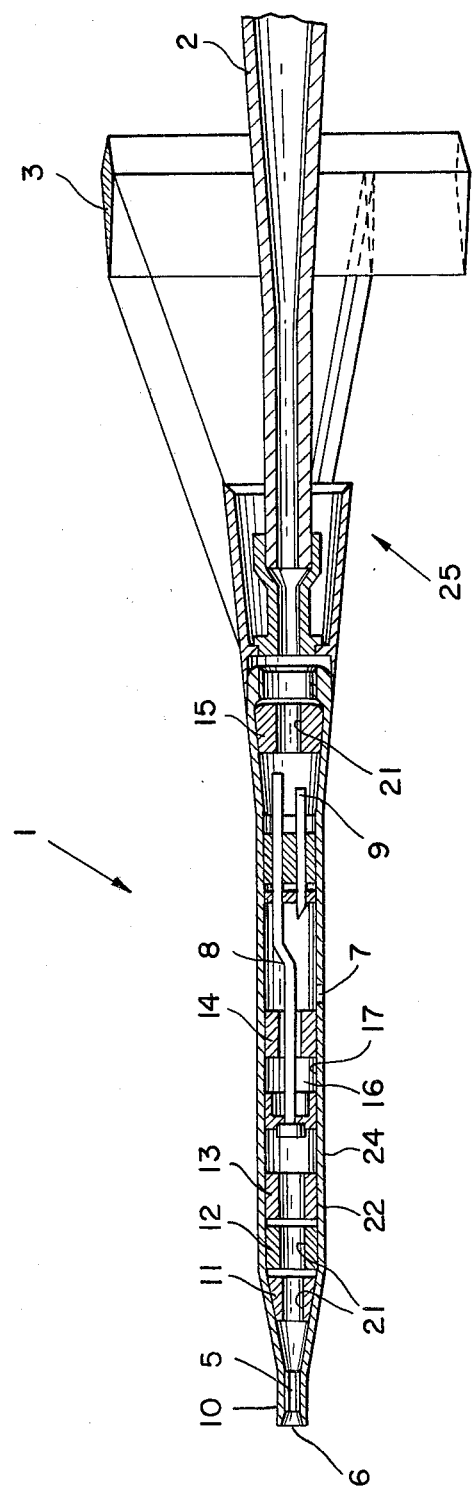

HEATING DEVICE FOR FLOW SONDES

The present invention relates to a heating device for flow sondes, particularly in aircraft, for measuring aerodynamic quantities or values, such as for example the total pressure, the static pressure, and the total temperature.

With flow sondes of the type referred to hereinabove, for example static tubes, Pitot tubes, or the like, essential parameters for the lift of a flow body are obtained. Furthermore, it is possible, on the basis of the measurement of the static pressure, to directly determine the barometric standard altitude (for example, the ICAO standard height or altitude). For the measurement of the total pressure by means of Pitot tubes, axially-directed bores are disposed within the sonde body, the opening of which at the front end face of the sonde points toward the direction of air flow, with the bore terminating in a measuring tube. In a manner similar to Pitot tubes, it is possible to employ temperature gauges (thermocouple elements) instead of the measuring tube for purposes of determining the total temperature. For purposes of measuring the static pressure, the sondes include radially-directed bores which are distributed over the circumference of the sonde body. Since the static pressure can be measured theoretically only at a sonde of infinite length positioned within the flow, measures or steps are taken which allow for simulating at the sondes pressure conditions or ratios which correspond to the pressure conditions or ratios theoretically arising at a sonde of infinite length. These measures or steps may include that the sondes are secured or attached to an aircraft by means of a strut, whereby it is the purpose of this strut to compensate either completely or partially for the static pressure being falsified or adulterated because of the blocking effect at the aircraft. In addition thereto, the adulterated pressure ratios also may be compensated for by the shape of the sonde body.

It is generally known that under specific conditions there will be a formation of an ice deposit or ice-up during flight, and specifically at the aircraft itself as well as at the sondes secured thereto. Due to the ice deposit or ice-up, the shape of the sonde body is altered, on the one hand, in such a manner that the values being measured no longer correspond to the real or actual conditions and, on the other hand, the ice deposit or ice-up may lead to a narrowing or even complete closure of the sampling openings at the sonde body.

In order to avoid these unfavorable effects, it is known in the art to provide for heating devices or means, for example electric resistance heating, at the sondes. In this particular type of heating, the wire spirals are generally inserted in the sonde body and partially also soldered thereto.

As a result of the high heat dissipation at the sondes during flight, such heating devices or means require the installation of devices of high heating outputs in order to assure a complete removal of the ice. Due to the devices of high heating output installed, however, and under conditions of low heat dissipation, for example while the aircraft is still on the ground prior to the start, the sondes are over-heated. As a result thereof, the surfaces of the sondes can become scaled, inter alia, and the heating spirals can blow out. The suggestion that the heating device be turned on only during icing conditions is counterbalanced because the flight personnel are already fully occupied with the ordinary tasks that must be fulfilled and cannot be additionally burdened with other supervisory tasks, and because recognition of the conditions which lead to icing is not always possible in a well-defined or unambiguous manner. Moreover, the functioning or operation of the heating device must be checked by the ground personnel, and because of the relatively high heating-up of the sonde body, there exists the danger that the ground personnel may suffer burns. For the reasons indicated hereinabove, the heating devices or means for the sondes are generally turned on prior to the start of an aircraft.

The present invention provides a heating device for flow sondes which operates with a high power input under conditions of high heat dissipation (icing conditions). The heating means is intended to operate below a given or predetermined temperature with as high a power input as possible so that a de-icing effect will occur and so that any water that may be present in the discharge openings and measuring bores will evaporate; above this temperature, the power input automatically should be greatly reduced. The heating device is further intended to require only the smallest possible number of structural parts and is to be adapted to be installed at a later date in existing flow sondes.

For purposes of obtaining a high heating output at a low ambient temperature and limitation of the power absorption once a predetermined temperature (evaporation temperature) has been attained, heating elements consisting of thermally controlled resistors displaying a low increase of resistance within a specific temperature range and a high increase within a range adjacent thereto are inserted in the body of the sonde. By virtue of the properties of the thermally controlled resistor heating elements, a heating device constructed as proposed by the present invention renders possible an automatically effective limitation of the heating-up of the sonde body in an extremely simple manner in case of an insufficient heat dissipation, and simultaneously a heating of the sonde body to a temperature at which the deposit of ice is definitely avoided with certainty. Accordingly, the use of temperature gauges and of means adapted to be influenced by the latter for purposes of controlling the heating power are rendered unnecessary. As a result, damage to the sonde and to the heating means itself due to too high a heating-up, as well as an overloading of the electrical wiring system of the aircraft are effectively eliminated.

The accompanying DRAWING illustrates one embodiment of the heating device proposed and constructed according to the present invention in which the sonde is shown in a longitudinal cross-sectional view thereof.

The sonde shown in the drawing represents a static tube (a Pitot static tube) which adjusts or adapts automatically in the flow. Reference numeral 1 designates the body of the sonde, reference numeral 2 designates the supporting mast being rigidly mounted at the airplane, and reference numeral 3 identifies the annular tail unit at the sonde body 1. In a manner known per se, the sonde body 1 contains or comprises an axial bore 5 which serves for measuring the total pressure and whose opening 6 at the front end face of the sonde body 1 points against the direction of air flow. Accommodated within the sonde body 1 is the measuring tube 8 which serves for measuring the total pressure. Also accommodated within the sonde body 1 is a measuring tube 9 serving for sampling the static pressure. The two measuring tubes 8 and 9 are connected, in a manner known per se, with a pressure differential measuring means and an absolute pressure measuring means which has, however, not been shown. Distributed on the circumference of the sonde body 1 and at a distance from the opening 6 for measuring the total pressure are the radial bores 7 which are machined into the sonde body 1; the static pressure is taken or sampled therefrom and conveyed to the measuring tube 9. Accommodated at the interior 16 of the sonde body 1 are the heating elements 10, 11, 12, 13, 14 and 15 at those points of the sonde body 1 which are subject to an increased danger of ice deposit. The heating elements consist of thermally controlled resistor elements which are linked via corresponding electric leads or supply lines (not shown) with a current source in a parallel connection. The heating elements 10 to 15 have an annular configuration and the bores 21 thereof serve for the connection of the opening 6 and/or 7 in the sonde body 1 and the measuring tubes 8 and/or 9 for measuring the total pressure and/or the static pressure. The heating elements rest with the circumferential surface area 22 thereof against the inner wall 17 of the sonde body 1 for the purpose of achieving an improved heat transmission. The sonde body 1 is so positioned, by means of a universal or Cardan joint 25, as to be pivotal in all directions with respect both to the aircraft, and the supporting mast or tube 2 being rigidly secured to the aircraft. By means of the annular tail unit 3, the sonde body 1 is adapted to become adjusted to the respective direction of air flow.

The operation of the heating device described herein is as follows: The thermally controlled resistor elements 10 to 15 as employed herein are resistors which constantly have little resistance until a predetermined temperature (the Curie temperature) is reached. Once the predetermined temperature (the Curie temperature) is reached, an abrupt increase of resistance will occur.

When the heating system is turned on prior to the start of the aircraft, the heating elements 10 to 15 absorb the predetermined power or output and transfer the heat to the sonde body 1 until the required temperature (the Curie temperature) has been reached. Due to the flow about the sonde body 1 during the flight, an increased heat dissipation is produced so that, as a result, the sonde body 1 will again cool down to a temperature range below the Curie temperature and transmit this temperature to the heating elements 10 to 15. Produced accordingly, in turn, is an increase of the power or output being absorbed. This assures that within the range below the Curie temperature, the maximally predetermined power or output is absorbed by the heating elements at all times and the sonde body 1 is at all times heated above the icing temperature.

It will be obvious to those skilled in the art that many modifications may be made within the scope of the present invention without departing from the spirit thereof, and the invention includes all such modifications.

What is claimed is:

1. In a flow sonde particularly for measuring aerodynamic values in aircraft such as the total pressure, the static pressure, and the total temperature,
    the improvement which comprises a plurality of thermally controlled resistor means in the sonde body, said means having a low increase of resistance within a specific temperature range below the Curie temperature and a high increase of resistance in an adjacent range above the Curie temperature,
    said resistor means having an annular configuration and resting with the circumferential surface area thereof against the inner wall of said sonde body at points subject to ice deposits, and being electrically connected in parallel,
    whereby there is obtained a high heating power at low ambient temperature and a limitation of the power absorption when a predetermined temperature is reached.

* * * * *